(12) United States Patent
Chun et al.

(10) Patent No.: US 9,688,249 B2
(45) Date of Patent: Jun. 27, 2017

(54) APPARATUS OF DETECTING POSITION OF ROTATING MEMBER AND SYSTEM OF OPERATING WIPER

(71) Applicant: HYUNDAI MOTOR COMPANY, Seoul (KR)

(72) Inventors: Sang Woo Chun, Seoul (KR); Jin Gyu Hong, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/519,350

(22) Filed: Oct. 21, 2014

(65) Prior Publication Data
US 2015/0175128 A1   Jun. 25, 2015

(30) Foreign Application Priority Data
Dec. 23, 2013 (KR) .................. 10-2013-0161439

(51) Int. Cl.
*H02P 1/04* (2006.01)
*H01H 19/20* (2006.01)
*B60S 1/08* (2006.01)
*H02K 7/116* (2006.01)
*H02K 11/21* (2016.01)

(52) U.S. Cl.
CPC .............. *B60S 1/08* (2013.01); *H02K 7/1166* (2013.01); *H02K 11/21* (2016.01)

(58) Field of Classification Search
CPC ............................. H04N 5/2254; H04N 5/378
USPC ........................................................ 318/443
See application file for complete search history.

(56) References Cited

U.S. PATENT DOCUMENTS

| | | | | |
|---|---|---|---|---|
| 3,574,882 A | * | 4/1971 | Petry ...................... | B60S 1/483 15/250.02 |
| 3,694,723 A | * | 9/1972 | Schneider ............... | B60S 1/163 200/568 |
| 3,717,048 A | * | 2/1973 | Carpenter ................ | B60S 1/08 15/250.17 |
| 3,808,629 A | * | 5/1974 | Druseikis .............. | B60S 1/0402 15/250.17 |
| 4,352,084 A | * | 9/1982 | Graves .................. | H01C 10/48 338/127 |
| 4,355,270 A | * | 10/1982 | Cook ....................... | B60S 1/08 318/443 |

(Continued)

FOREIGN PATENT DOCUMENTS

| | | |
|---|---|---|
| JP | 11-289791 A | 10/1999 |
| JP | 2006-168394 A | 6/2006 |
| KR | 10-2008-0056465 A | 6/2008 |

*Primary Examiner* — Eduardo Colon Santana
*Assistant Examiner* — Devon Joseph
(74) *Attorney, Agent, or Firm* — McDermott Will & Emery LLP

(57) ABSTRACT

An apparatus of detecting a position of a rotating member includes a cam plate connected to the rotating member. The cam plate includes a plurality of segments that are spaced apart from each other. The plurality of segments are disposed in an annular shape. A fixed ring is disposed between the cam plate and the worm wheel. A first contact point is in contact with an interior portion of any one of the segments and maintaining a fixed state. A second contact point is formed at an external circumferential portion of any one of the segments and is in contact with the fixed ring.

17 Claims, 7 Drawing Sheets

(56) References Cited

U.S. PATENT DOCUMENTS

| | | | | |
|---|---|---|---|---|
| 4,547,716 A * | 10/1985 | Johnson | B60S 1/482 |
| | | | 15/DIG. 15 |
| 4,599,546 A * | 7/1986 | Uemura | B60S 1/08 |
| | | | 318/286 |
| 4,609,794 A * | 9/1986 | Porter | H01H 19/62 |
| | | | 200/11 G |
| 4,672,226 A * | 6/1987 | Sutherland | G05F 1/59 |
| | | | 307/43 |
| 4,673,853 A * | 6/1987 | Tsunoda | B60S 1/0807 |
| | | | 15/250.17 |
| 4,689,535 A * | 8/1987 | Tsunoda | B60S 1/185 |
| | | | 15/250.17 |
| 4,742,280 A * | 5/1988 | Ishikawa | B60S 1/482 |
| | | | 15/250.17 |
| 5,095,255 A * | 3/1992 | Honda | B60S 1/245 |
| | | | 15/250.13 |
| 5,117,168 A * | 5/1992 | Nomura | B60S 1/0818 |
| | | | 318/444 |
| 5,216,341 A * | 6/1993 | Nomura | B60S 1/0818 |
| | | | 318/444 |
| 5,239,244 A * | 8/1993 | Teder | B60S 1/0818 |
| | | | 318/444 |
| 5,252,897 A * | 10/1993 | Porter | B60S 1/0814 |
| | | | 318/443 |
| 5,404,085 A * | 4/1995 | Resch | B60S 1/08 |
| | | | 318/443 |
| 5,705,755 A * | 1/1998 | Yamamura | E05F 15/41 |
| | | | 73/862.191 |
| 5,712,547 A * | 1/1998 | Porter | G05F 1/46 |
| | | | 307/10.1 |
| 5,924,324 A * | 7/1999 | Kilker | F16H 19/08 |
| | | | 15/250.3 |
| 6,028,407 A * | 2/2000 | Yoshioka | B60S 1/08 |
| | | | 318/280 |
| 6,163,125 A * | 12/2000 | Bernauer | B60J 7/0573 |
| | | | 318/626 |
| 6,609,266 B1 * | 8/2003 | Satoh | B60S 1/08 |
| | | | 15/250.13 |
| 7,586,275 B2 * | 9/2009 | Amagasa | B60S 1/08 |
| | | | 318/280 |
| 2013/0127304 A1 * | 5/2013 | Belanger | H02K 7/1166 |
| | | | 310/68 B |

* cited by examiner

APPARATUS OF DETECTING POSITION OF ROTATING MEMBER AND SYSTEM OF OPERATING WIPER

CROSS-REFERENCE TO RELATED APPLICATION

This application claims the benefit of priority to Korean Patent Application No. 10-2013-0161439 filed in the Korean Intellectual Property Office on Dec. 23, 2013, the entire contents of which are incorporated herein by reference.

TECHNICAL FIELD

The present disclosure relates to an apparatus of detecting a position of a rotating member and a system of operating a wiper. More particularly, the present disclosure relates to an apparatus of detecting a position of a rotating member and a system of operating a wiper which can detect the position of the rotating member without a sensor by dividing a cam plate connected to the rotating member into a plurality of segments and connecting neighboring segments through a resistance module that can flow current only in one direction.

BACKGROUND

Generally, a mechanically controlled system of operating a wiper cannot realize various functions (e.g., controlling a parking position of the wiper, controlling a service position of the wiper, controlling a wiping angle of the wiper, and so on) and has a lower merchantable quality than an electrically controlled system of operating a wiper. However, since the electrically controlled system of operating a wiper requires a position sensor for detecting a position of a motor, a controller for controlling operation of the motor, and a data communication system, manufacturing cost may be high.

Since the mechanically controlled system of operating a wiper is hard to detect the position of the motor, the mechanically controlled system cannot realize various functions. If the position of the motor or a position of a rotating member connected to the motor can be detected without the position sensor, merchantability of the mechanically controlled system may be enhanced.

Therefore, development of an apparatus of detecting the position of the rotating member through simple structural changes is needed.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus of detecting a position of a rotating member and a system of operating a wiper having advantages of detecting the position of the rotating member without a sensor by dividing a cam plate connected to the rotating member into a plurality of segments and connecting neighboring segments through a resistance module that can flow current only in one direction.

An apparatus of detecting a position of a rotating member according to an exemplary embodiment of the present disclosure includes a cam plate connected to the rotating member so as to rotate with the rotating member. The cam plate includes a plurality of segments that are spaced apart from each other. The plurality of segments are disposed in an annular shape. A fixed ring is disposed at a radial exterior of the cam plate, spaced apart from the cam plate, and maintains a fixed state. A first contact point is in contact with an interior portion of any one of the segments and maintains a fixed state. A second contact point is formed at an external circumferential portion of any one of the segments and is in contact with the fixed ring.

The plurality of segments may have the same shape.

The plurality of resistance modules may be disposed at an external circumferential portion of the cam plate.

The plurality of resistance modules may be adapted to flow the current only in either a clockwise direction or a counterclockwise direction.

Each of the resistance modules may include a resistor and a diode.

A system of operating a wiper according to another exemplary embodiment of the present disclosure includes a motor provided with a motor shaft having a worm formed at an exterior circumference thereof. A worm wheel is engaged with the worm. A cam plate is disposed at a radial interior of the worm wheel, connected to the worm wheel to rotate with the worm wheel, and includes a plurality of segments that are spaced apart from each other. The plurality of segments are disposed in an annular shape. A fixed ring is disposed between the cam plate and the worm wheel and maintains a fixed state. A first contact point is in contact with an interior portion of any one of the segments and maintains a fixed state. A second contact point is formed at an external circumferential portion of any one of the segments and adapted to contact with the fixed ring. A wiper is connected to the cam plate and rotatable by torque of the cam plate. One of the fixed ring and the first contact point is connected to a power supply, and the other of the fixed ring and the first contact point is connected to a ground.

The plurality of segments may have the same shape.

The plurality of resistance modules may be disposed at an external circumferential portion of the cam plate.

The plurality of resistance modules may be adapted to flow the current only in either a clockwise direction or a counterclockwise direction.

Each of the resistance modules may include a resistor and a diode.

Any one segment among the plurality of segments may be set as a parking position.

The second contact point may be formed at the segment set as the parking position.

The motor may reciprocally move the wiper to by repetitively rotating in a positive direction and a negative direction.

Any one segment among the plurality of segments other than the segment set as the parking position may be set as a service position.

A wiping angle of the wiper may be controlled by setting any two segments among the plurality of segments other than the segment set as the parking position.

DETAILED DESCRIPTION OF THE EMBODIMENTS

An exemplary embodiment of the present disclosure will hereinafter be described in detail with reference to the accompanying drawings.

Figure 1:
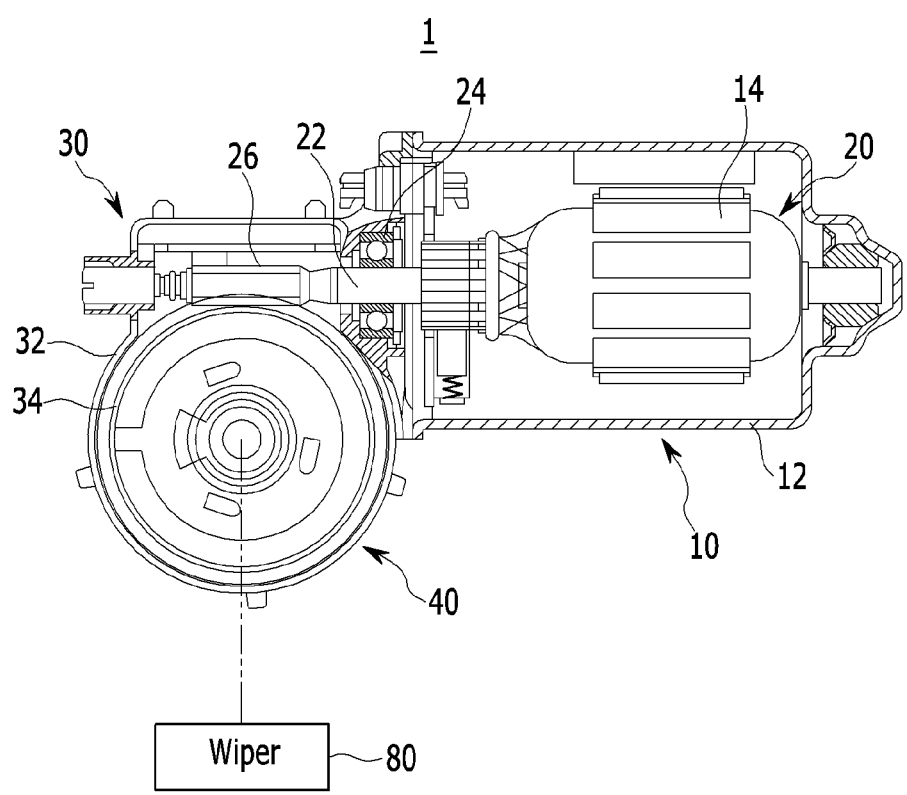
FIG. 1 is a schematic diagram of a system of operating a wiper according to an exemplary embodiment of the present disclosure.

FIG. 1 is a schematic diagram of a system of operating a wiper according to an exemplary embodiment of the present disclosure.

As shown in FIG. 1, a system 1 of operating a wiper according to an exemplary embodiment of the present disclosure includes a motor 10, a gear 30, and the wiper 80.

The motor 10 supplies power for operating the wiper 80 and includes a motor housing 12, an armature 20, and a motor shaft 22.

The motor housing 12 is a structure enclosing the motor 10 and has a space formed therein. In addition, one side surface of the motor housing 12 is blocked, and the opposite side surface of the motor housing 12 is open. A plurality of permanent magnets 14 are fixed to an interior circumference of the motor housing 12 and generate a magnetic field.

The armature 20 is disposed in a center portion of the space of the motor housing 12 and is enclosed by the plurality of permanent magnets 14. The armature 20 is formed by coiling a coil on a core. If current is applied to the coil of the armature 20, the armature 20 can rotate in either a clockwise direction or a counterclockwise direction according to a direction of the current.

The motor shaft 22 is connected to the armature 20 and rotates with the armature 20. The motor shaft 22 extends through an opening formed at the other side surface of the motor housing 12. A bearing 24 is interposed between the motor shaft 22 and the motor housing 12 to smoothly rotate the motor shaft 22. In addition, a worm 26 is formed at an exterior circumference of the motor shaft 22.

The gear 30 decreases a rotational speed of the motor shaft 22, changes a rotating direction, and transmits torque of the motor shaft 22 to the wiper 80. The gear 30 includes a gear housing 32, a worm wheel 34, and a position detecting device 40.

The gear housing 32 is a structure enclosing the worm wheel 34 and has a space formed therein. The gear housing 32 is coupled to the motor housing 12.

The worm wheel 34 is disposed in the gear housing 32. A gear teeth engaging with the worm 26 of the motor shaft 22 is formed at an exterior circumference of the worm wheel 34. Through this configuration, the rotating direction and the rotation speed of the motor shaft 22 are changed and are then transmitted to the worm wheel 34.

The position detecting device 40 detects a position of the worm wheel 34 and will be described in further detail hereinafter.

Figure 2:
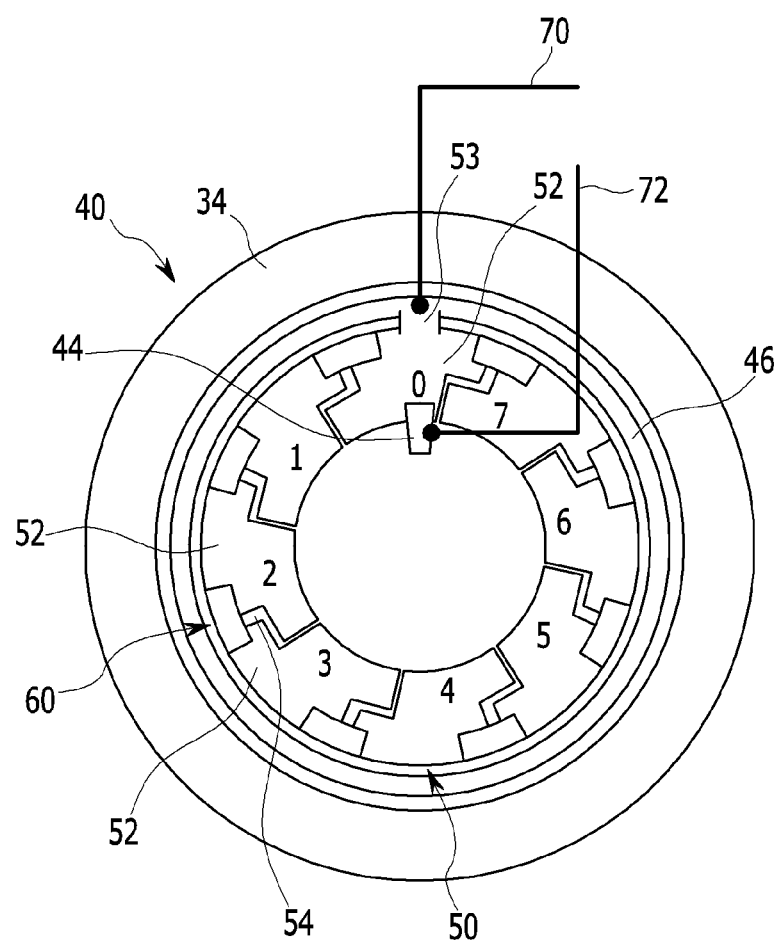
FIG. 2 is a schematic diagram of a position detecting device according to an exemplary embodiment of the present disclosure.

FIG. 2 is a schematic diagram of a position detecting device according to an exemplary embodiment of the present disclosure.

As shown in FIG. 2, the position detecting device 40 includes a cam plate 50, a fixed ring 46, and first and second contact points 44 and 53.

The cam plate 50 is connected to the worm wheel 34 and rotates with the worm wheel 34. In FIG. 2, it is exemplified that the cam plate 50 is disposed at a radial interior and spaced apart from the worm wheel 34. Any device of connecting one rotating member with another rotating member so as to transmit torque therebetween that is known to a person of an ordinary skill in the art may be used to connect the worm wheel 34 with the cam plate 50. For example, a portion extending axially from one side surface of the cam plate 50 may be formed and may be press-fitted, splined, or engaged on an interior circumference of the worm wheel 34.

The cam plate 50 is formed by coupling a plurality of segments 52 in an annular shape. The number of the segments 52 may be determined according to target functions by a person of an ordinary skill in the art. In addition, the number of the segments 52 is related to a rotation range of the cam plate 50 that the position detecting device 40 can detect. For example, if the number of the segments 52 is 8, the position detecting device 40 can detect rotation of the cam plate 50 by 45° (If the cam plate 50 rotates 0°-45°, it is detected that the cam plate 50 does not rotates. If the cam plate 50 rotates 45°-90°, it is detected that the cam plate 50 rotates 45°.). In addition, if the number of the segments 52 is 30, the position detecting device 40 can detect rotation of the cam plate 50 by 12°.

Furthermore, neighboring segments 52 are spaced by a gap 54 and are electrically connected by a resistance module 60. The segments 52 have the same shape, and the shape of each segment 52 may be determined according to the target functions by a person of an ordinary skill in the art.

As shown in FIG. 2, a plurality of resistance modules 60 may be disposed at an external circumferential portion of segments 52, but is not limited thereto.

Figure 3:
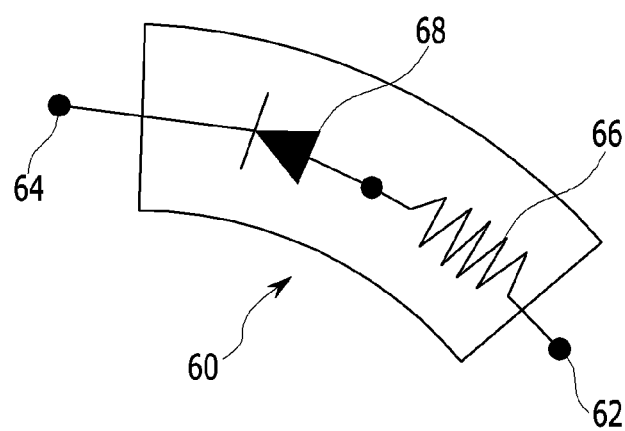
FIG. 3 is a schematic diagram of a resistance module according to an exemplary embodiment of the present disclosure.

As shown in FIG. 3, each resistance module 60 includes third and fourth contact points 62 and 64, a resistor 66, and a diode 68.

The third contact point 62 contacts with one of the neighboring segments 52, and the fourth contact point 64 contacts with the other of the neighboring segments 52. Constituent elements of each resistance module 60 other than the third and fourth contact points 62 and 64 are electrically insulated from the segments 52. That is, the current flows between the segments 52 only through the third and fourth contact points 62 and 64.

One end of the resistor 66 is connected to the third contact point 62 and is used to detect the number of the segments 52 through which the current passes.

One end of the diode 68 is connected to the resistor 66, and the other end of the diode 68 is connected to the fourth contact point 64. The diode 68 is adapted for the current to flow only in one direction. For example, as shown in FIG. 3, the resistance module 60 causes the current to flow only in the counterclockwise direction. In addition, the plurality of resistance modules 60 are so disposed that the current flows in the same direction.

The fixed ring 46 is disposed between the worm wheel 34 and the cam plate 50. The fixed ring 46 maintains a fixed state. That is, the fixed ring 46 is fixed, for example, to the gear housing 32. Although the cam plate 50 and the worm wheel 34 rotate, the fixed ring 46 does not rotate. The fixed ring 46 may be connected to a power supply 70. In addition, the power supply 70 may be provided in a controller (not shown) for controlling operation of the wiper 80.

The first contact point 44 contacts with an interior circumferential portion of any one of the plurality of segments 52 and maintains a fixed state. That is, the first contact point 44 is fixed, for example to the gear housing 32. The first contact point 44 may contact with one segment 52 between the neighboring segments 52. The first contact point 44 may be electrically connected to a ground 72.

The second contact point 53 is formed at an external circumferential portion of any one of the plurality of segments 52 and is electrically connected to the fixed ring 46 permanently.

FIGS. 4 to 7 illustrate that the position detecting device 40 according to the exemplary embodiment of the present disclosure detects a position of the cam plate 50. It is exemplified in FIGS. 4 to 7 but is not limited that the cam plate 50 is formed by eight segments 52. In addition, each segment 52 is electrically marked (by e.g., a resistor) in order to detect the segments 52 through which the current passes. It is exemplified in this specification but is not limited that the position of the cam plate 50 is detected based on the resistance between the first contact point 44 and the second contact point 53.

Figure 4:
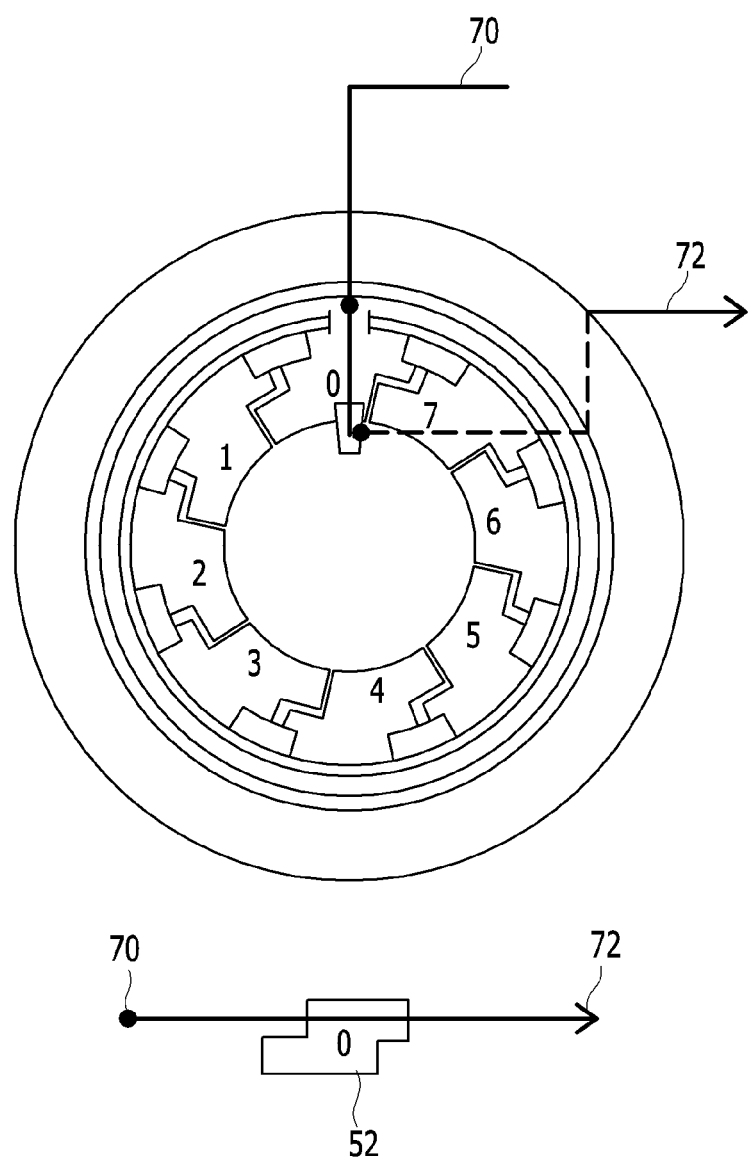
FIG. 4 is a schematic diagram of a position detecting device with a cam plate not rotating according to an exemplary embodiment of the present disclosure.

As shown in FIG. 4, if the cam plate 50 does not rotate, both of the first contact point 44 and the second contact point 53 are connected to segment 0. That is, the current flows through the power supply 70, segment 0, and the ground 72. In this case, since the resistance module 60 does not exist between the power supply 70 and the ground 72 in a current path, the resistance between the power supply 70 and the ground 72 may be 0 or be a value close to 0.

Figure 5:
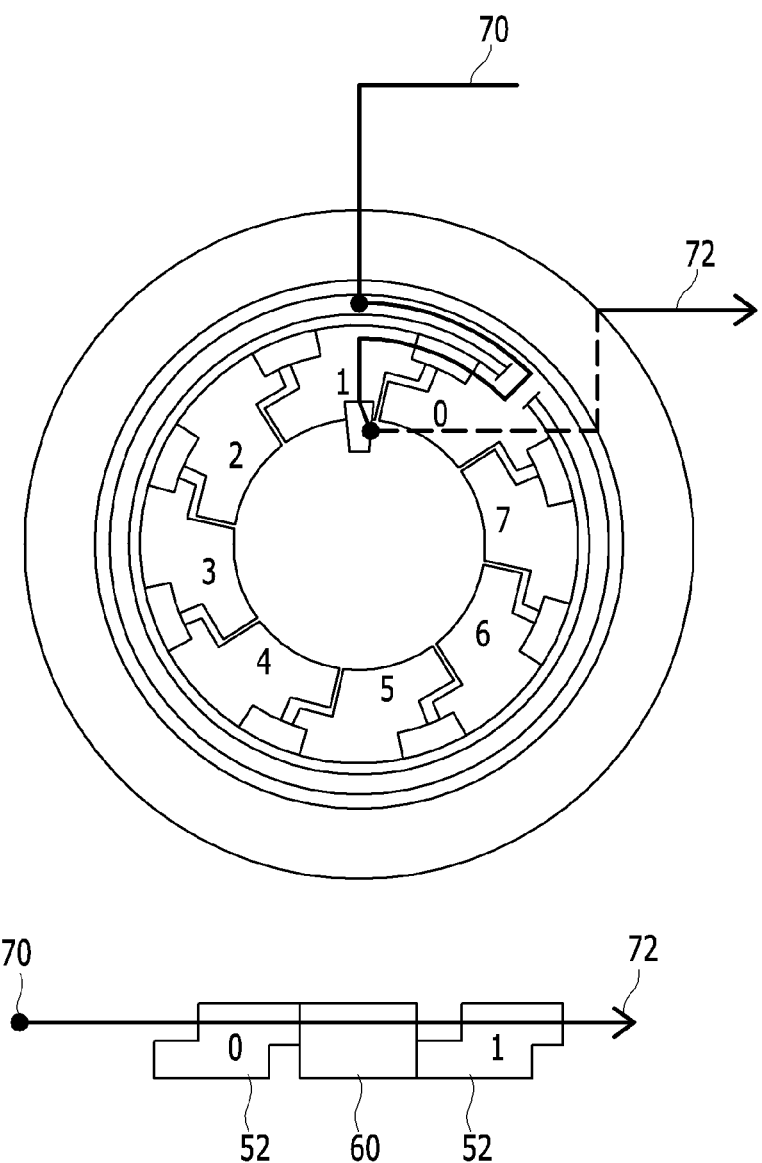
FIG. 5 is a schematic diagram of a position detecting device with a cam plate rotating 45° in a clockwise direction according to an exemplary embodiment of the present disclosure.

As shown in FIG. 5, if the cam plate 50 rotates 45° in the clockwise direction, the first contact point 44 is connected to segment 1, and the second contact point 53 is connected to segment 0. Since the current flows between the segments 52 only in the counterclockwise direction by the resistance module 60, the current flows through the power supply 70, segment 0, the resistance module 60, segment 1, and the ground 72. In this case, since one resistance module 60 exists between the power supply 70 and the ground 72 in the current path, the resistance between the power supply 70 and the ground 72 may be a value corresponding to one resistor 66.

Figure 6:
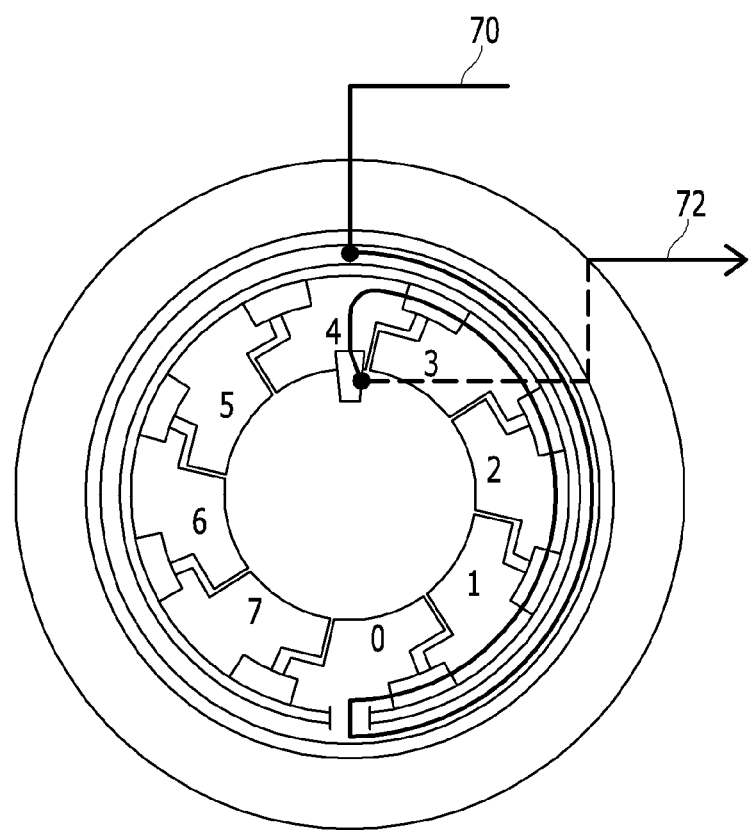
FIG. 6 is a schematic diagram of a position detecting device with a cam plate rotating 180° in a clockwise direction according to an exemplary embodiment of the present disclosure.
Figure 6:
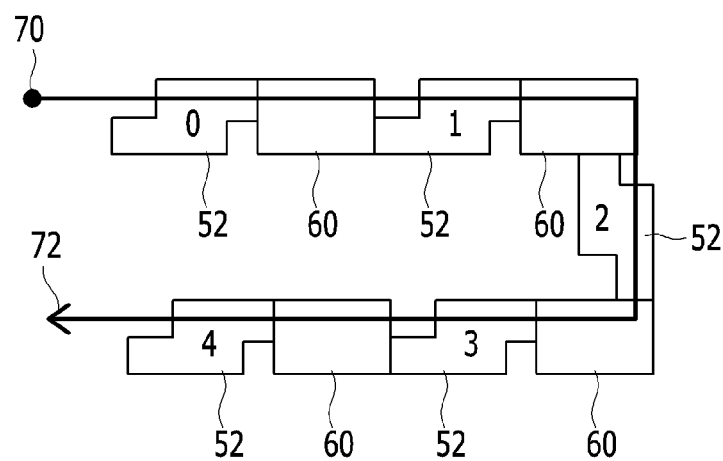

As shown in FIG. 6, if the cam plate 50 rotates 180° in the clockwise direction, the first contact point 44 is connected to segment 4, and the second contact point 53 is connected to segment 0. Therefore, the current flows through the power supply 70, segment 0, the resistance module 60, segment 1, the resistance module 60, segment 2, the resistance module 60, segment 3, the resistance module 60, segment 4, and the ground 72. In this case, since four resistance modules 60 exist between the power supply 70 and the ground 72 in the current path, the resistance between the power supply 70 and the ground 72 may be a value corresponding to four resistors 66.

Figure 7:
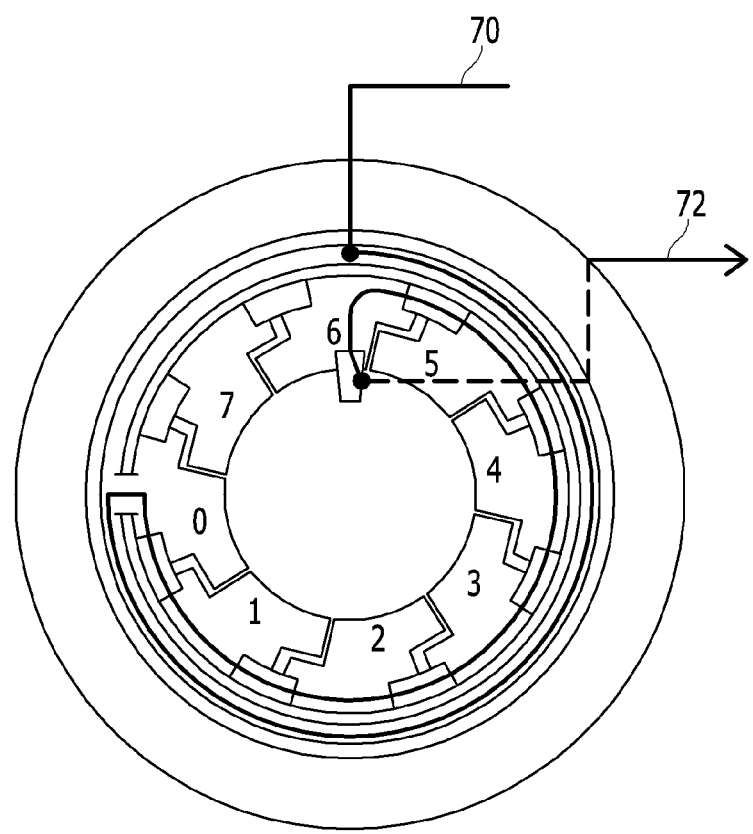
FIG. 7 is a schematic diagram of a position detecting device with a cam plate rotating 270° in a clockwise direction according to an exemplary embodiment of the present disclosure.
Figure 7:
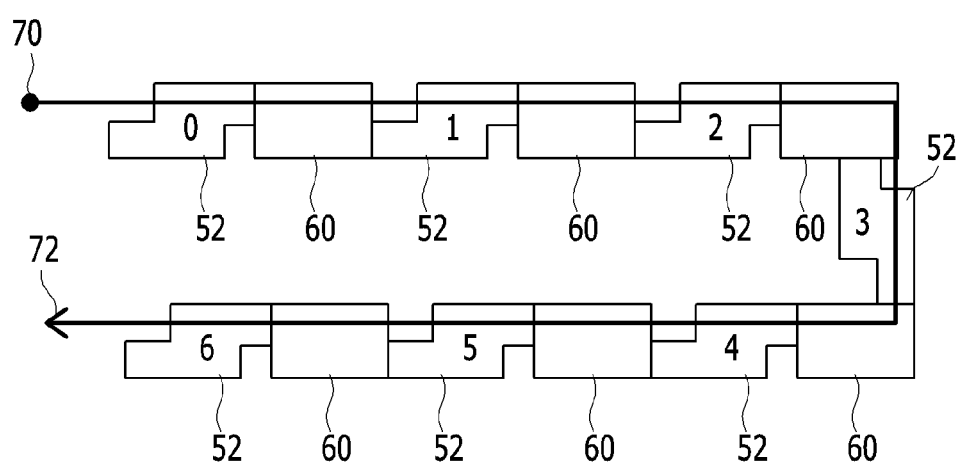

As shown in FIG. 7, if the cam plate 50 rotates 270° in the clockwise direction, the first contact point 44 is connected to the segment 6 and the second contact point 53 is connected to the segment 0. Therefore, the current flows through the power supply 70, the segment 0, the resistance module 60, the segment 1, the resistance module 60, the segment 2, the resistance module 60, the segment 3, the resistance module 60, the segment 4, the resistance module 60, the segment 5, the resistance module 60, the segment 6, and the ground 72. In this case, six resistance modules 60 exist between the power supply 70 and the ground 72 in the current path, the resistance between the power supply 70 and the ground 72 may be a value corresponding to six resistors 66.

As described above, the position of the cam plate 50 can be detected based on the resistance between the power supply 70 and the ground 72.

The wiper 80 is connected to the worm wheel 34 and receives torque from the worm wheel 34. Connecting means for changing a rotational angle of the wiper 80 according to a rotational angle of the worm wheel 34 may be mounted between the wiper 80 and the worm wheel 34. For example, the connecting means may rotate the wiper 80 by 180° when the worm wheel 34 rotates 360°.

Since the system 1 of operating the wiper according to the exemplary embodiment of the present disclosure can detect the position of the cam plate 52, i.e., the worm wheel 34, various functions may be achieved as follows.

Setting Parking Position

Any one of the plurality of segments 52 may be set as a parking position. For example, segment 0 may be set as the parking position. In this case, operating range of the wiper 80 corresponds to segment 1 to segment 7. In addition, the second contact point 53 may be formed at segment 0.

If the wiper 80 does not operate (i.e., a wiper switch is switched off, or a vehicle is parked during operation of the wiper), the controller controls the motor 10 to cause the first contact point 44 to be connected to the segment 0.

Therefore, if the wiper 80 is not used, a clear view of a driver may be secured and an aesthetic appearance may be improved.

Reducing Mounting Space of Wiper

Currently, linkages are interposed between a mechanically controlled wiper and a motor, and the motor rotates only in one direction. The linkages cause the wiper to move reciprocally one time when the motor makes one revolution. However, a space for mounting the linkages between the motor and the wiper is very small.

Since the position of the cam plate 50 can be detected according to the exemplary embodiment of the present disclosure, operation of the wiper 80 can be controlled by the motor which can rotate in both clockwise and counterclockwise directions. For example, if the operating range of the wiper 80 corresponds to segment 1 to segment 7, the cam plate 50 can be controlled, such that the first contact point 44 is sequentially connected to segment 1 to segment 7. In this case, the wiper 80 is controlled to rotate in the clockwise direction. On the contrary, if the cam plate 50 causes the first contact point 44 to be sequentially connected to segment 7 to segment 1, the wiper 80 can rotate in the counterclockwise direction. That is, if the first contact point 44 is connected to segment 1 or segment 7, the cam plate 50 is controlled to change the rotating direction thereof.

Since the linkages between the wiper 80 and the worm wheel 34 can be removed, a mounting space of the wiper may be reduced.

Setting Service Position

Any one segment 52 among the plurality of segments 52 other than the segment 52 set as the parking position may be set as a service position. For example, segment 3 may be set as the service position.

If a driver switches on an additional switch, the controller controls the motor 10 to connect the first contact point 44 to segment 3.

Therefore, the driver can change a wiper blade after the wiper 80 is positioned at a target position that the driver wants.

Controlling Wiping Angle

A wiping angle of the wiper 80 can be controlled by setting any two segments 52 among the plurality of segments 52 other than the segment 52 which is set as the parking position. For example, the two segments may be segment 3 and segment 6.

When it snows in winter, the wiper 80 may not be operated at a complete operating region due to the snow. In this case, the controller may control the motor 10 such that the wiper 80 operates only between predetermined segments. For example, if the complete operating range of the wiper 80 is a range corresponding to segment 1 to segment 7, the controlled operating range of the wiper 80 may be a range corresponding to segment 3 to segment 6.

The position detecting device 40 can detect a position of any rotating member. For example, the cam plate 50 is formed by combining the plurality of segments 52 and is connected to any rotating member so as to rotate with any rotating member. The fixed ring 46 and the first contact point 44 are fixedly disposed, and the first contact point 44 contacts with any one of the plurality of segments 52 and is connected to one of the ground 72 and the power supply 70. The second contact point 53 is formed at any one of the plurality of segments, contacts with the fixed ring 46, and is connected to the other rest of the ground 72 and the power supply 70. In addition, the resistance module 60 is disposed between the neighboring segments 52 such that the current flows in one direction. In this case, the position detecting device 40 can detect the position of the rotating member.

As described above, the position of the rotating member can be detected without a sensor by changing a structure of the cam plate connected to the rotating member according to an exemplary embodiment of the present disclosure.

The system of operating the wiper achieving various functions by detecting the position of the rotating member may be provided.

While this inventive concept has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus of detecting a position of a rotating member comprising:
    a cam plate connected to the rotating member to rotate with the rotating member and including a plurality of segments that are spaced apart from each other, the plurality of segments being disposed in an annular shape;
    a fixed ring disposed at a radial exterior of the cam plate and spaced apart from the cam plate, the fixed ring maintaining a fixed state;
    a first contact point contacting an interior portion of any one of the segments and maintaining a fixed state; and
    a second contact point formed at an external circumferential portion of any one of the segments and contacting the fixed ring,
    wherein the cam plate further includes a plurality of resistance modules disposed on an inner circumference of the cam plate, the plurality of resistance modules connecting neighboring segments such that current can flow only in one direction, and
    wherein one of the fixed ring and the first contact point is connected to a power supply and the other of the fixed ring and the first contact point is connected to a ground.

2. The apparatus of claim 1, wherein the plurality of segments have the same shape.

3. The apparatus of claim 1, wherein the plurality of resistance modules are disposed at an external circumferential portion of the cam plate.

4. The apparatus of claim 1, wherein the plurality of resistance modules flow the current only in any one direction between a clockwise direction and a counterclockwise direction.

5. The apparatus of claim 1, wherein each of the resistance modules includes a resistor and a diode.

6. The system of claim 1, wherein each of the resistance modules further includes a third contact point contacting one of the neighboring segments and a fourth contact point contacting the other of the neighboring segments.

7. A system of operating a wiper comprising:
    a motor having a motor shaft having a worm formed at an exterior circumference of the motor shaft;
    a worm wheel engaged with the worm;
    a cam plate disposed at a radial interior of the worm wheel, connected to the worm wheel to rotate with the worm wheel, and the cam plate including a plurality of segments that are spaced apart from each other, the plurality of segments being disposed in an annular shape;
    a fixed ring disposed between the cam plate and the worm wheel, and the fixed ring maintaining a fixed state;
    a first contact point contacting an interior portion of any one of the segments and maintaining a fixed state;
    a second contact point formed at an external circumferential portion of any one of the segments and contacting the fixed ring; and
    a wiper connected to the cam plate and the wiper being rotatable by torque of the cam plate,
    wherein one of the fixed ring and the first contact point is connected to a power supply and the other of the fixed ring and the first contact point is connected to a ground, and
    wherein the cam plate further includes a plurality of resistance modules disposed on an inner circumference of the cam plate, the plurality of resistance modules connecting neighboring segments such that current can flow only in one direction.

8. The system of claim 7, wherein the plurality of segments have the same shape.

9. The system of claim 7, wherein the plurality of resistance modules are disposed at an external circumferential portion of the cam plate.

10. The system of claim 7, wherein the plurality of resistance modules flow the current only in any one direction between a clockwise direction and a counterclockwise direction.

11. The system of claim 7, wherein each of the resistance modules includes a resistor and a diode.

12. The system of claim 7, wherein each of the resistance modules further includes a third contact point contacting one of the neighboring segments and a fourth contact point contacting the other of the neighboring segments.

13. The system of claim 7, wherein any one segment among the plurality of segments is set as a parking position.

14. The system of claim 13, wherein the second contact point is formed at the segment set as the parking position.

15. The system of claim 7, wherein the motor reciprocally moves the wiper by repetitively rotating in a positive direction and a negative direction.

16. The system of claim 13, wherein any one segment among the plurality of segments other than the segment set as the parking position is set as a service position.

17. The system of claim 13, wherein a wiping angle of the wiper is controlled by setting any two segments among the plurality of segments other than the segment set as the parking position.

\* \* \* \* \*